(12) United States Patent
Fulks

(10) Patent No.: US 6,422,125 B1
(45) Date of Patent: Jul. 23, 2002

(54) FORCE SENSOR FOR AN INPUT PUSH ROD OF A POWER BOOSTER

(75) Inventor: Gary C. Fulks, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/795,173

(22) Filed: Feb. 28, 2001

(51) Int. Cl.[7] .................................................. F01B 25/26
(52) U.S. Cl. .................................................... 91/376 R
(58) Field of Search ....................... 91/1, 376 R; 92/5 R

(56) References Cited

U.S. PATENT DOCUMENTS

| | | | |
|---|---|---|---|
| 4,718,324 A | | 1/1988 | Gautier et al. .................... 91/1 |
| 5,857,399 A | * | 1/1999 | Tsubouchi et al. .......... 91/369.1 |
| 5,873,296 A | | 2/1999 | Shirahata et al. ........... 91/369.2 |
| 5,927,832 A | | 7/1999 | Fulks et al. .................. 303/167 |
| 6,006,649 A | | 12/1999 | Parker et al. ............... 91/369.2 |
| 6,164,183 A | * | 12/2000 | Fulks et al. .................... 91/367 |
| 6,282,896 B1 | * | 9/2001 | Wachi et al. ................ 60/547.2 |

FOREIGN PATENT DOCUMENTS

| | | | | |
|---|---|---|---|---|
| EP | 0136690 A2 | * | 4/1985 | .......... B60T/13/24 |
| EP | 0327276 A3 | | 8/1989 | |
| EP | 0327276 B1 | | 8/1989 | |
| EP | 0327276 A2 | | 8/1989 | |

* cited by examiner

Primary Examiner—Edward K. Look
Assistant Examiner—Igor Kershteyn
(74) Attorney, Agent, or Firm—Scott A. McBain

(57) ABSTRACT

An input push rod for applying an input force from a brake pedal to a power booster of a brake system. The input push rod includes a sensor that is capable of generating an electrical output having a magnitude that varies with the amount of force applied to the input push rod by the brake pedal. Preferably, the sensor generates an output voltage signal that is generally proportional to the input force applied to the input push rod. The output signal generated by the sensor is applied to a brake light control system that uses the signal to determine whether the vehicle brake lights should be illuminated.

16 Claims, 3 Drawing Sheets

FORCE SENSOR FOR AN INPUT PUSH ROD OF A POWER BOOSTER

FIELD OF THE INVENTION

The present invention generally relates to power boosters for vehicle brake systems and, more particularly, to an input push rod for applying an input force from a brake pedal to the power booster.

BACKGROUND OF THE INVENTION

Brake power boosters generally utilize fluid pressure, or differentials thereof, to provide a power assist in applying force to the master cylinder of the brake system. Upon application of an input force on the brake pedal, an input member such as a push rod activates the power booster. The power booster intensifies the force applied to the input push rod by a calibrated amount and transfers the force to a power piston which then moves the master cylinder to apply the brakes at each wheel.

In the past, brake power boosters have incorporated electromechanical switches as part of the booster structure to cause illumination of the vehicle brake lights upon movement of the input rod. For example, power boosters have been designed that include an electrical circuit coupled to the brake illumination control system that causes illumination of the brake lights when the normally-open circuit is closed by a switch. The switch is typically biased in an open position and, in response to travel of the input push rod upon an input force being applied to the brake pedal, moves to a closed position to complete an electrical circuit that illuminates the brake lights.

Brake light control systems that use electromechanical switches to cause illumination of the vehicle brake lights have several drawbacks. For example, the brake booster and input push rod must be designed with additional structures for housing the switch arrangement and for attaching the switch actuation components to the input push rod. These additional structures increase the required space of the power booster which can give rise to installation difficulties when space is limited. Additionally, the electro-mechanical switch must be factory calibrated or adjusted to ensure that the brake lights are not illuminated when the input push rod is in a rest position, but are properly illuminated in response to a predetermined limited travel of the input push rod upon a force being applied to the brake pedal. Further, electromechanical switches used in brake light control systems may cause false illumination of the brake lights when the switch is jostled or the driver unintentionally causes travel of the input push rod in a non-braking situation.

For these general reasons, it would be desirable to provide a brake power booster system that accurately and reliably illuminates brake lights of a vehicle in response to a driver's input on a brake pedal during a braking situation.

SUMMARY OF THE INVENTION

The present invention overcomes the foregoing and other shortcomings and drawbacks of brake systems heretofore known and, more particularly, of brake light control systems for causing illumination of brake lights. While the invention will be described in connection with certain embodiments, it will be understood that the invention is not limited to these embodiments. On the contrary, the invention includes all alternatives, modifications and equivalents as may be included within the spirit and scope of the present invention.

In accordance with the principles of the present invention, an input push rod is adapted to be operatively coupled at one end to a brake pedal and at an opposite end to a power booster of a brake system. The input push rod is capable of applying a force to the power booster that is intensified and applied to a master cylinder of the brake system through a power piston and force output rod to apply the brakes at each wheel. The input push rod includes a sensor that is capable of generating an electrical output having a magnitude that varies with the amount of force applied to the input push rod by the brake pedal. Preferably, the sensor generates an output voltage signal having a magnitude that is generally proportional to the input force applied to the input push rod by the brake pedal. The output voltage signal generated by the sensor is preferably applied to a brake light control system that uses the signal to determine whether the vehicle brake lights should be illuminated. The output voltage signal is also preferably applied to an anti-lock braking control system (ABS) and vehicle stability control system that use this force-related data for controlling other important vehicle functions as well.

In accordance with one aspect of the present invention, the input push rod includes a pair of elongated input push rod members and a coupling member operatively connecting the pair of input push rod members so that the input push rod members extend generally along a common axis. The coupling member comprises a front body portion operatively connected to one of the input push rod members and a rear body portion operatively connected to the other input push rod member. The front and rear body portions of the coupling member are biased relative to each other by a stacked formation of biasing elements, such as by a stack of Belleville washers, so that the pair of elongated input push rod members are effectively biased relative to each other. The pre-load of the washers is adjustable so that the travel distance or displacement of the rear body portion toward the front body portion in response to a predetermined input force applied to the input push rod can be readily adjusted.

The sensor is supported by the coupling member and preferably comprises a permanent button magnet and a linear hall effect transducer. Preferably, the magnet and transducer are mounted in confronting relationship on an axis that is generally coextensive with the common axis so that the magnet and transducer are moveable relative to each other generally along the common axis. Electrical leads couple the transducer to one or more vehicle control systems, such as the brake light control system, an anti-lock braking control system (ABS) and a vehicle stability control system.

In accordance with the principles of the present invention, the transducer is operable to generate an electrical output that varies in magnitude with the amount of force applied to the input push rod through the brake pedal. As the input forces on the input push rod increase through driver input on the brake pedal, the gap distance between the permanent magnet and the linear hall effect transducer decreases, thereby resulting in a change in the output voltage of the transducer. The brake light control system is preferably configured to receive the output voltage signal generated by the transducer, and to use the magnitude of the output signal to determine whether the brake lights should be illuminated. The magnitude of the output voltage signal at which the brake lights are illuminated may be chosen to correspond to an input force on the input push rod that is indicative of an intended braking action by the driver.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION OF THE PREFERRED EMBODIMENT

Figure 1:
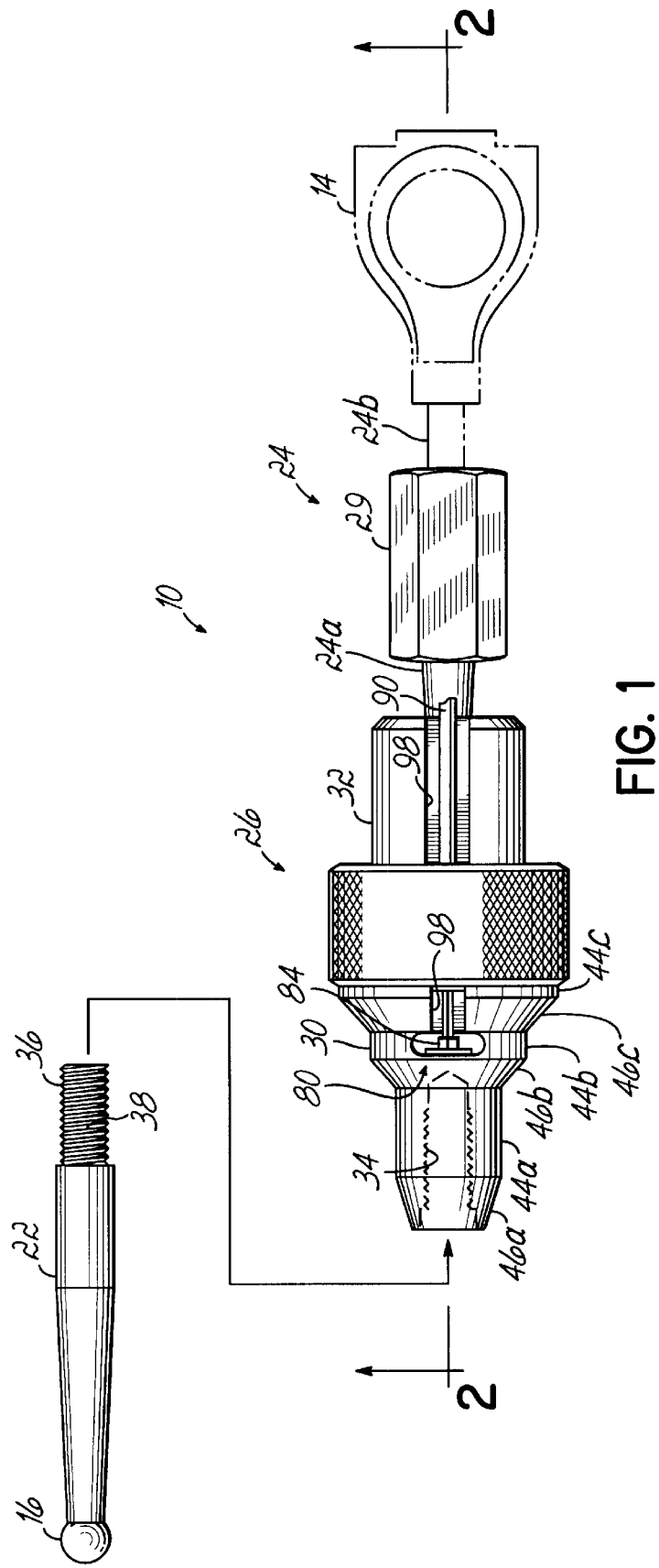
FIG. 1 is a disassembled elevational view of an input push rod and force sensor in accordance with the principles of the present invention for causing illumination of a vehicle's brake lights during a braking situation.
Figure 2:
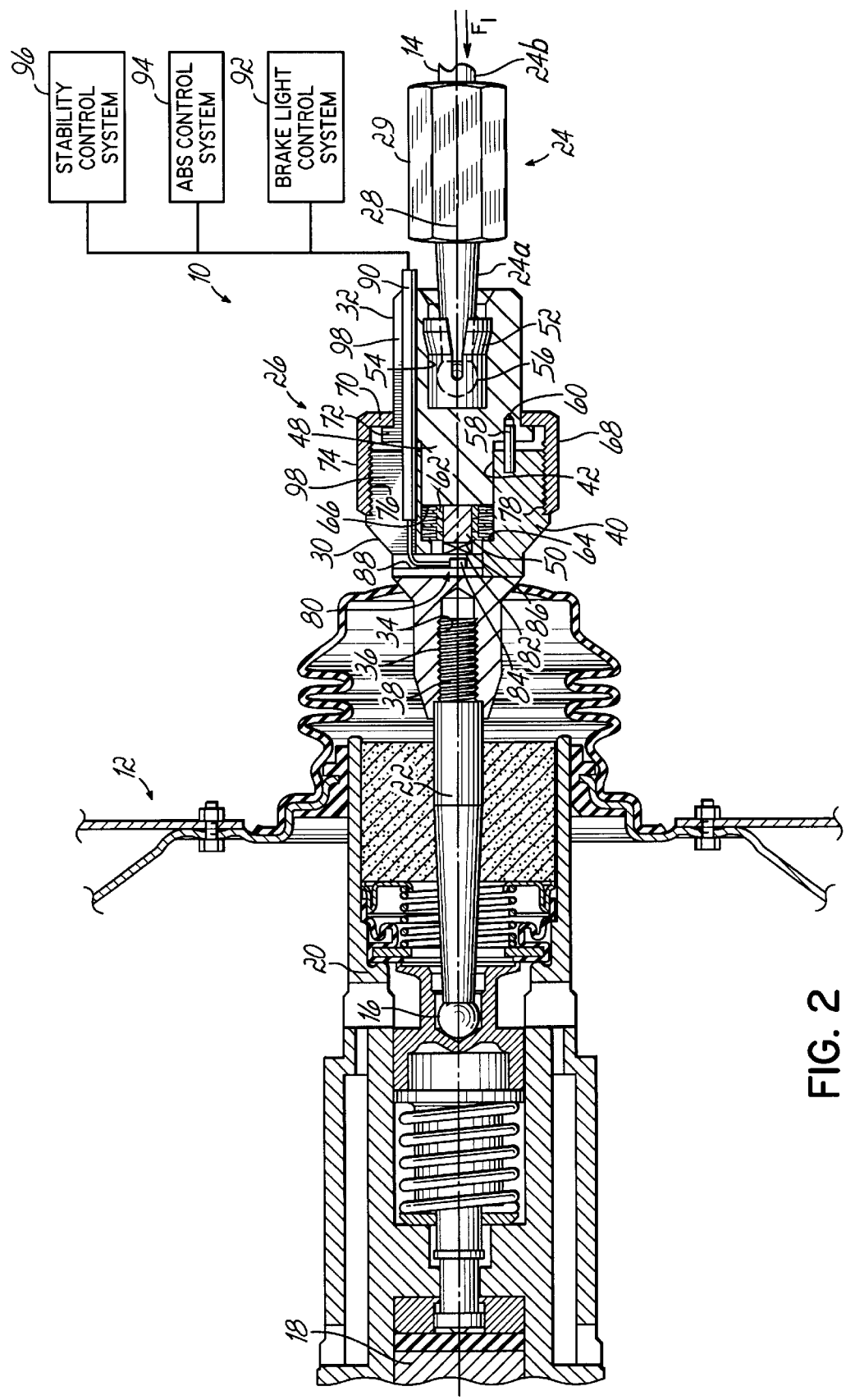
FIG. 2 is a partial cross-sectional view of the input push rod and force sensor taken generally along line 2—2 of FIG. 1, and further illustrating the input push rod operatively connected to a power booster of a brake system.

With reference to the Figures, and to FIGS. 1 and 2 in particular, an input push rod 10 in accordance with the principles of the present invention is shown connected to a power booster 12 (FIG. 2) of a brake system, such as a power booster used in an automobile. Input push rod 10 has one end 14 adapted to be connected to a brake pedal (not shown) and another end 16 adapted to be connected to the power booster 12 so that input forces $F_I$ applied to the input push rod 10 through the brake pedal (not shown) will generate intensified output forces $F_O$ to be applied to the master cylinder (not shown) of the brake system through force output rod 18 (FIG. 2) as is well known in the art. The power booster 12 intensifies the input force applied by the input push rod 10 by a calibrated amount and transfers the force to a power piston 20 (FIG. 2) which then moves the master cylinder (not shown) to apply the brakes at each wheel.

Power booster 12 may comprise a dual diaphragm vacuum operated booster utilizing vacuum and atmospheric pressure differentials to boost input forces $F_I$ generating intensified output forces $F_O$, however the present invention is also applicable to systems with a single diaphragm vacuum booster and with power boosters operating with other power sources without departing from the spirit and scope of the present invention. An exemplary dual diaphragm power booster for use with the present invention is fully disclosed in U.S. Pat. No. 6,006,649, owned by the common assignee, and hereby expressly incorporated herein by reference in its entirety to which the reader is referred.

In accordance with the principles of the present invention, input push rod 10 includes a pair of elongated input push rod members 22 and 24 that are connected by a coupling member 26 so that the input push rod members 22 and 24 preferably extend substantially along a common axis 28 (FIG. 2) and are effectively biased relative to each other as will be described in detail below. As shown in FIG. 1, the input push rod member 24 preferably includes a front input push rod portion 24a and a rear input push rod portion 24b that are connected by a threaded nut 29. Coupling member 26 includes a front body portion 30 and a rear body portion 32 that are mounted to move relative to each other in a direction substantially parallel to the common axis 28. Front body portion 30 preferably includes a threaded bore 34 at a forward end thereof that engages external threads 36 formed on a free end 38 of the input push rod member 22. The threaded coupling of the input push rod member 22 with the forward end of the coupling member 26 permits the free length of the input push rod member 22 to be extended or retracted along the common axis 28 so that the input push rod 10 can be readily adjusted in overall length to fit a variety of different brake system applications. Alternatively, it will be appreciated that the input push rod member 22 and the front body portion 30 may be rigidly connected or manufactured as an integral piece. In this alternative embodiment, the overall length of the input push rod 10 may be adjusted through an adjustment of the thread nut 29 connecting the front and rear input push rod portions 24a, 24b to vary the free length of the input push rod member 24.

Front body portion 30 includes at a rearward end thereof an annular sleeve 40 that defines a cylindrical bore 42 having an axis generally coextensive with the common axis 28. Preferably, the outer surface of the front body portion 30 is defined by cylindrical segments 44a, 44b and 44c, and conical segments 46a, 46b, and 46c so that the front body portion 30 tapers generally outwardly from the forward end to the rearward end.

Rear body portion 32 includes a forwardly extending cylindrical boss 48 that is slidably received in the cylindrical bore 42 of the front body portion 30. A second cylindrical boss 50, having a reduced diameter relative to the diameter of cylindrical boss 48, extends forwardly from the cylindrical boss 48 and is also received for movement within the cylindrical bore 42. Rear body portion 32 includes at a rearward end thereof a connector 52 received within a bore 54 that engages a free end 56 of the input push rod member 24. A key 58 and key hole 60 are provided in the front and rear body portions 30 and 32, respectively, to prevent rotation of the front and rear body portions 30, 32 relative to each and thereby limit relative movement of the front and rear body portions 30, 32 in a direction generally parallel to the common axis 28.

As shown in FIG. 2, the front and rear body portions 30, 32 are biased relative to each other by biasing elements, preferably in the form of Belleville washers 62, that are arranged or stacked in alternating or opposite orientations about the forwardly extending cylindrical boss 50. The biasing elements 62 provide a biasing force between a radially inwardly extending annular shoulder 64 of the front body portion 30 and a forwardly facing wall 66 of the cylindrical boss 48.

A threaded cap 68 is provided to adjust the spring pre-load or spring rate of the biasing elements 62. The cap 68 includes a radially inwardly directed annular shoulder 70 that engages a radially outwardly directed annular shoulder 72 formed on the rear body portion 32. The cap 68 further includes an axially extending annular collar 74 having internal threads 76 that engage with external threads 78 formed on the front body portion 30. Rotation of the cap 68 in one direction causes the rear body portion 32 to move axially toward the front body portion 30, thereby increasing the pre-load on the Belleville washers 62. Conversely, rotation of the cap 68 in an opposite direction permits the rear body portion 32 to move axially away from the front body portion 30 under the biasing force applied by the Belleville washers 62 to decrease the spring pre-load. It will be appreciated by those of ordinary skill in the art that by adjusting the pre-load of the biasing elements 62, the travel distance or displacement of the rear body portion 32 toward the front body portion 30 in response to a predetermined input force applied to input rod member 24 can be readily adjusted.

In accordance with the principles of the present invention, a sensor 80, preferably in the form of a permanent button magnet 82 and a linear hall effect transducer 84, is supported by the coupling member 26. In one embodiment of the present invention as shown in FIG. 2, the magnet 82 is mounted or affixed to a forwardly facing wall 86 of the cylindrical boss 50, and the linear hall effect transducer 84 is mounted or affixed to a rearwardly facing wall 88 of the front body portion 30. Preferably, the ma gnet 82 and t ran sducer 84 are mounted in confronting relationship on an axis that is generally coextensive with the common axis 28 so that the magnet 82 and transducer 84 are moveable relative to each other generally along the common axis s 28. Electrical leads 90 couple the transducer 84 to one or more vehicle control systems, such as a brake light control system 92, an anti-lock braking control system (ABS) 94 and a vehicle stability control system 96. It will be appreciated that these control systems may be controlled by a single common controller or, alternatively, by a separate controller dedicated to each control system. As shown in FIGS. 1 and 2, channels or raceways 98 are formed on the respective outer circumferences of the front and rear body portions 30, 32 for receiving the electrical leads 90.

Figure 3:
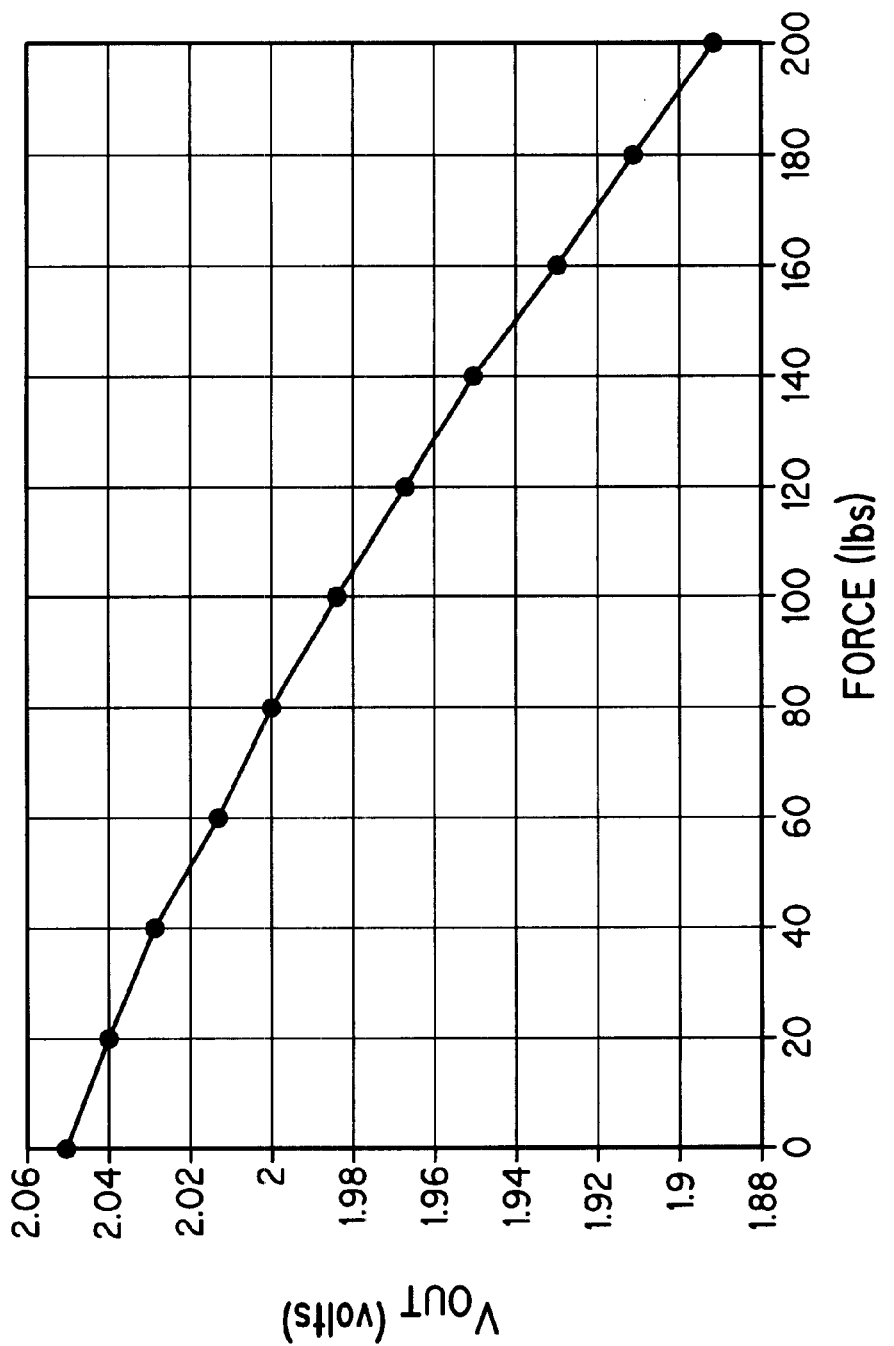
FIG. 3 is a graph illustrating output voltage of the force sensor versus input force applied to the input push rod from a brake pedal according to the principles of the present invention.

In accordance with the principles of the present invention, sensor 80 is operable to generate an electrical output that varies in magnitude with the amount of force applied to the input push rod member 24 through the brake pedal (not shown), as illustrated by the graph of FIG. 3 that shows the output voltage of the sensor 80 versus the input force applied to input push rod member 24. As shown in FIG. 3, the output voltage ($V_{OUT}$) of sensor 80 is generally proportional to the input force over a range of input forces, such as between 0 and 200 lbs.

As the input forces on the input push rod 10 increase, the gap distance between the permanent magnet 82 and the linear hall effect transducer decreases, thereby resulting in a decrease in the output voltage of the transducer 84. Alternatively, the output voltage of the transducer 84 can be made to increase with an increase in the input force applied on the input push rod 10 if the polarity of the magnet 82 is reversed. Of course, it will be appreciated that the orientation of the magnet 82 and transducer 84 can be reversed, and the mounting of the magnet 82 and transducer 84 relative to the common axis 28, can be changed without departing from the spirit and scope of the present invention. While magnet 82 and hall effect transducer 84 are shown and described in connection with a preferred embodiment of the sensor 80, other sensors having electrical outputs that will vary in magnitude generally proportionally with the amount of force applied to the input push rod 10 are possible as well.

As shown in FIG. 2, the electrical output signal generated by the transducer 84 is preferably applied to one or more of the brake light control system 92, anti-lock braking control system (ABS) 94 and vehicle stability control system 96. For example, the brake light control system 92 is preferably configured to receive the output voltage signal generated by the transducer 84, and to use the magnitude of the output signal to determine whether the brake lights (not shown) should be illuminated. The brake light control system 92 may include logic that will illuminate the brake lights if the magnitude of the output voltage of the transducer 84 is at or below a predetermined voltage, thereby assuring that a predetermined force has been applied to the brake pedal (not shown) before the brake lights are illuminated. The magnitude of the output voltage signal at which the brake lights are illuminated may be chosen to correspond to an input force on the input push rod 10 that is indicative of an intended braking action by the driver. Additionally, the anti-lock braking control system (ABS) 94 and vehicle stability control system 96 may receive the output signal generated by the transducer 84, and use this force-related data for controlling other important vehicle functions as well.

While the present invention has been illustrated by a description of a preferred embodiment and while this embodiment has been described in some detail, it is not the intention of the Applicant to restrict or in any way limit the scope of the appended claims to such detail. Additional advantages and modifications will readily appear to those skilled in the art. The various features of the invention may be used alone or in numerous combinations depending on the needs and preferences of the user. This has been a description of the present invention, along with the preferred methods of practicing the present invention as currently known.

However, the invention itself should only be defined by the appended claims, wherein I claim:

1. Apparatus for providing a force to a power booster of a brake system, comprising:

an input push rod including an elongated first input push rod member adapted to be operatively coupled to a brake pedal and an elongated second input push rod member mounted for movement relative to the first input push rod member and adapted to be operatively coupled to a power booster of a brake system for providing a force to the power booster upon an input force being applied to the brake pedal; and a sensor responsive to relative movement between the first and second input push rod members and capable of generating an electrical output having a magnitude that varies With the amount of input force applied to the input push rod by the brake pedal.

2. The apparatus of claim 1, wherein the input push rod further comprises a coupling member operatively connecting the first and second input push rod members so that the first and second input push rod members extend along a common axis.

3. The apparatus of claim 2, wherein at least one of the first and second input push rod members has an adjustable free length along the common axis.

4. The apparatus of claim 2, wherein the coupling member comprises:

a first body portion operatively connected to one of the first and second input push rod members;

a second body portion mounted for movement relative to the first body portion and operatively connected to the other of the first and second input push rod members; and a plurality of biasing elements mounted to apply a biasing force between the first and second body portions to effectively bias the first and second input push rod members relative to each other.

5. The apparatus of claim 4, wherein the biasing elements comprise a plurality of Belleville washers.

6. The apparatus of claim 4, wherein the coupling member further comprises a coupling portion mounted to move the first and second body portions relative to each other to adjust the biasing force applied by the plurality of biasing elements.

7. The apparatus of claim 2, wherein the sensor is supported by the coupling member.

8. The apparatus of claim 1, wherein the sensor comprises a magnet and a linear hall effect transducer.

9. The apparatus of claim 2, wherein the sensor comprises a magnet and a linear hall effect transducer mounted to move relative to each other substantially along the common axis.

10. Apparatus for providing a force to a power booster of a brake system, comprising:

a first input push rod member having one end adapted to be operatively coupled to a brake pedal and an opposite free end;

a second input push rod member having one end adapted to be operatively coupled to a power booster of a brake system for providing a force to the power booster upon an input force being applied to the brake pedal and an opposite free end;

a coupling member operatively connecting the free ends of the first and second input push rod members so that the first and second push rod members extend along a common axis and are biased for movement relative to each other; and a sensor supported by the coupling member and responsive to relative movement between the first and second input push rod members to generate an electrical output having a magnitude that varies with the amount of input force applied to the first input push rod by the brake pedal.

11. The apparatus of claim 10, wherein at least one of the first and second input push rod members has an adjustable free length along the common axis.

12. The apparatus of claim 10, wherein the coupling member comprises:

a first body portion operatively connected to a free end of one of the first and second input push rod members;

a second body portion mounted for movement relative to the first body portion and operatively connected to a free end of the other of the first and second input push rod members; and a plurality of biasing elements mounted to apply a biasing force between the first and second body portions to effectively bias the first and second input push rods relative to each other.

13. The apparatus of claim 12, wherein the biasing elements comprise a plurality of Belleville washers.

14. The apparatus of claim 12, wherein the coupling member further comprises a coupling portion mounted to move the first and second body portions relative to each other to adjust the biasing force applied by the plurality of biasing elements.

15. The apparatus of claim 10, wherein the sensor comprises a magnet and a linear hall effect transducer.

16. The apparatus of claim 15, wherein the magnet and the linear hall effect transducer are mounted to move relative to each other substantially along the common axis.

\* \* \* \* \*